Nov. 19, 1968  R. H. KOLB  3,412,226
METHOD AND APPARATUS FOR RESISTANCE BUTT WELDING UNDER WATER
Filed Nov. 24, 1964

INVENTOR:
ROBERT KOLB
BY: [signature]
HIS ATTORNEY 3,412,226
METHOD AND APPARATUS FOR RESISTANCE BUTT WELDING UNDER WATER
Robert H. Kolb, Houston, Tex., assignor to Shell Oil Company, New York, N.Y., a corporation of Delaware
Filed Nov. 24, 1964, Ser. No. 413,436
5 Claims. (Cl. 219—8.5)

ABSTRACT OF THE DISCLOSURE

A method and apparatus for resistance welding under water wherein a conductive metal clamping means is used to hold the two workpieces in an abutting relationship. The clamping means and workpieces form a single-turn, low-impedance conductive path. A large welding current is induced in the conductive path by a toroidal coil that surrounds a portion of the clamping structure.

---

Figure 1:
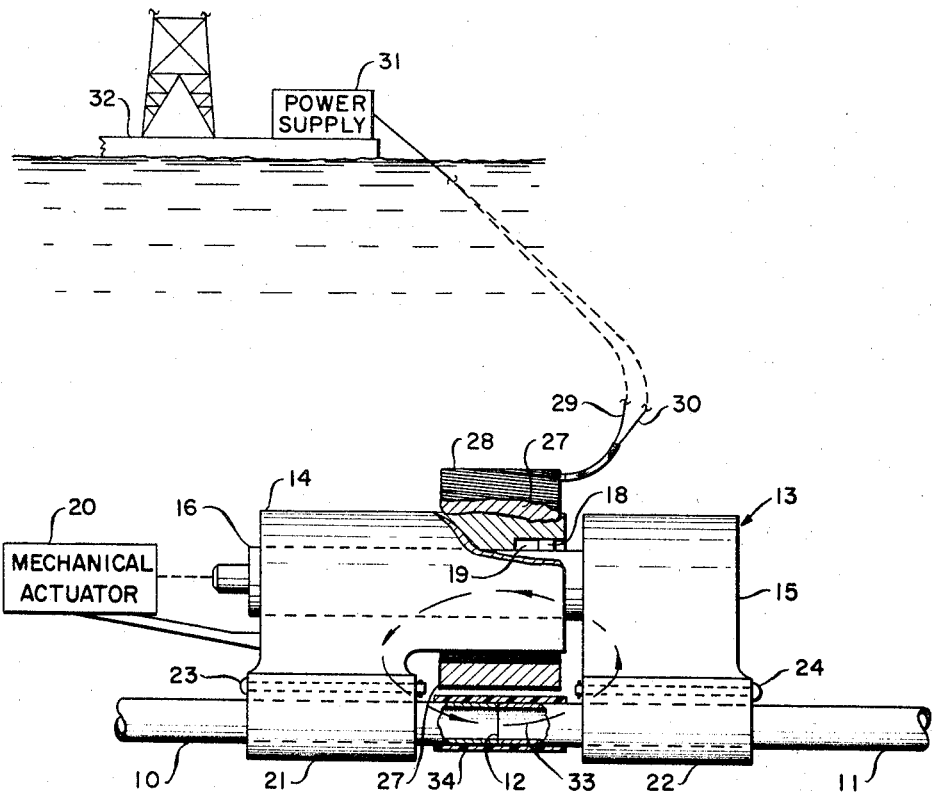

This invention relates to a method and apparatus for butt welding together the opposed ends of two metal members. More particularly, this invention relates to a method and apparatus for resistance butt welding together the opposed ends of two sections of metal pipe or tubing whereby the welding may take place under water, if desired, without requiring any expensive waterproofing or shielding of the welding equipment.

In the production of oil fields, it is the usual practice to transfer the produced oil from the various wells by means of rigid steel pipelines to a central collecting, treating and storing point prior to marketing. Normally these steel pipelines are formed by welding the various sections of pipe together by utilizing either arc welding or flame welding techniques. With the recent interest and development of deep water off-shore locations of oil wells, a number of problems have arisen due to the particular environment which make the previously used welding techniques unsatisfactory. In addition to the problem of shielding the open arc or the flame utilized in the previously used welding techniques from the water, both of these techniques involve progressive welds which proceed at a slow rate and require constant surveillance. Since many of the underwater locations are at depths at which divers cannot operate or at which it is uneconomical to utilize divers, relatively complicated remote control and surveillance systems would have to be designed in order to produce satisfactory results with the conventionally used welding techniques. Such complicated remote control and surveillance equipment is both expensive to build and to maintain.

A welding technique which appears to be compatible with underwater use and which eliminates the problem of slow progressive welds is the electrical resistance butt welding. According to this welding tehnique, the two sections of pipe to be united are aligned and held by means of a clamping structure so that the surfaces to be welded are in contact and held against one another by a large axial pressure. A source of direct current or low frequency alternating current is then connected across the joint formed by the contact of the two pipes so that a current passes into one of the pipes, through the joint and out by the other pipe. Since most of the resistance in the circuit is at the joint formed by the two pipes, most of the power in the flowing current is dissipated at the joint; resulting in heating the two abutting pipe ends. Once the metal of the abutting pipe ends has reached the fusion temperature, the axial pressure being exerted on the two pipes will force the two abutting pipe ends together, causing them to fuse, and thereby forming an instantaneous weld. Following fusion, the flow of current is discontinued, and the metal is allowed to cool.

While the electrical resistance butt welding technique appears to solve the problem of constant surveillance and complicated remote control equipment in view of the instantaneous welding obtained, and, because of the low voltages and high currents used, appears to be completely compatible with the salt water environment in which it is desired to use the technique, electrical resistance butt welding still presents a number of problems that must be overcome before the technique may be used satisfactorily and economically for underwater welding. Normally the connections are made either directly to the pipe or to the individual clamping means holding the pipe sections. This produces contact resistances which necessitate greater capacities for the power sources. Moreover, when used in a corrosive atmosphere such as salt water, this contact resistance can be appreciably increased by corrosion and subquent loosening, which can eventually result in faulty operation of the device.

Another problem which presents itself in the conventional form of apparatus used for resistance butt welding is that of providing insulating members of high mechanical strength in the clamping arrangement. Since the clamping members are usually large metal members in order to provide sufficient mechanical strength, such insulating members, which mechanically can be a major problem, are necessary in order to insulate the individual clamping members holding each of the pipe sections from one another in order to prevent the welding current from short circuiting around the point of contact between the two surfaces to be welded.

Still another problem which occurs when using an electrical resistance butt welding technique under water is the problem of water-proofing the various electrical components to eliminate short circuiting through the water. Because of the extremely high currents necessary for the welding, it is common practice in electrical resistance welders to transmit the power from the power source to the welding area as high-voltage, low current power in order to avoid excessive power losses during the transmission and then to convert the power, by means of a transformer having a secondary winding of low resistance and high current capacity to the low-voltage, high current power required for welding. The output of the transformer is then connected across the desired joint. This type of transformer and its connections result in a fairly massive structure which must be entirely waterproofed if the system is to be used in an underwater environment.

The above-mentioned problems due to electrical contact resistance, large insulating members in the clamping structure, and massive structures which must be water-proofed are eliminated by applicant's invention. Briefly, according to the invention, the opposed ends of the two parts to be welded are clamped together under an axial pressure by means of a massive metal clamping structure so that the metal clamping structure and the portions of the two metal pieces which are clamped together within the clamping structure form a closed, relatively low impedance, conductive path. The large welding current is then induced into the conductive path by means of a toroidal coil surrounding a portion of the clamping structure. With this configuration, the closed conductive path formed by the clamping structure and the pipe sections to be welded effectively form the large current carrying secondary winding of a transformer with the toroidal coil being the primary winding. When this configuration is used under water, only the toroidal coil need be waterproofed in order to prevent short circuiting. Moreover, since the clamping structure itself is part of the conductive path necessary to carry the large welding current, no insulating members need be provided.

Figure 2:
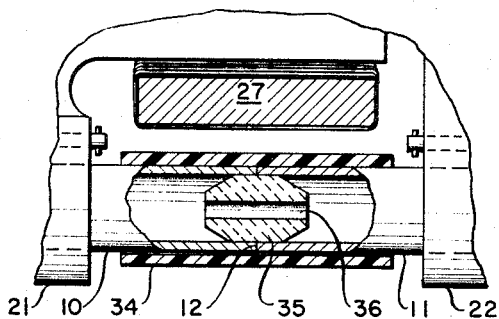

The above briefly described invention and its advantages will be more easily understood from the following detailed description of the invention when taken in conjunction with the accompanying drawings wherein:

FIGURE 1 is a diagram, partially in section, showing a preferred embodiment of a resistance butt welding apparatus according to the invention; and FIGURE 2 is a sectional view of a portion of the apparatus of FIGURE 1 showing a modification thereof.

Referring now to FIGURE 1 of the drawings, there is shown a pair of metallic electrically conductive members 10 and 11, i.e., steel pipes, each having a surface 12 to be welded. These surfaces, which are preferably flat and parallel so that a good electrical contact across the entire surface is provided, are held in abutting relationship by means of a metal clamping and aligning structure 13. As shown in the figure, the metal clamping and aligning structure 13 consists of a pair of massive slidably engageable members 14 and 15. In order to reduce the resistance to flow of electrical current between the two members 14 and 15, the sliding joint between the members 14 and 15 is formed by a solid metal rod 16 on the member 15 which fits within a cavity in the member 14 and which engages the member 14 substantially along its entire length; thus providing a large surface area and thereby reducing the contact resistance. If desired, the surface areas in contact between the members 14 and 15 may be further increased by splining both the shaft 16 and the cavity in the member 14. The rod 16 is also provided with a key 18 which contacts and engages a keyway 19 in the member 14 in order to provide for proper alignment of the members 14 and 15 while supporting the pipes 10 and 11 for welding. Connected to the free end of the rod 16 is an actuator 20, which may be electrical, mechanical or hydraulic, for the purpose of exerting a constant predetermined force on the clamping and aligning means 13 to tend to bring the members 14 and 15 together and thereby maintain an axial pressure on the abutting surfaces 12 of the pipes 10 and 11. In order to clamp or hold the pipes 10 and 11, each of the members 14 and 15 is provided with gripping portions 21 and 22, respectively, which completely encircle the respective pipes 10 and 11. These gripping portions 21 and 22 may take the form of any conventional type of gripping member commonly used in the electrical butt welding art, but preferably are of sufficient length along the axis of the pipe to provide a large surface area so that when the pipes are tightly gripped, the contact resistance between the respective pipes and gripping portions of the structure 13 is of low resistance. As is also common in the art, the gripping portions 21 and 22 are preferably hinged, for example, as indicated by rods 23 and 24, respectively, in order to provide for ease in inserting and gripping the pieces to be welded.

Surrounding a portion of the clamping and aligning structure 13 is a toroidal magnetic core 27, preferably laminated, having a multiturn helical winding 28 thereon. Connected to the toroidal winding 28 by means of a pair of leads 29 and 30 is a conventional relatively high impedance alternating current power supply 31 for providing high-voltage, low current power to the coil 28. When the welding is to take place underwater, the power supply 31 is preferably located out of the water, e.g., on a ship or barge 32, as indicated, in order to eliminate the necessity of waterproofing the power supply.

With the configuration shown, the coil 28 effectively acts as the primary of a transformer, while the continuous conductive path formed by the members 13 and 14 and the portions of the pipes 10 and 11 between the gripping pieces 21 and 22 effectively forms the high current, single turn secondary of the transformer. Accordingly, any high voltage signal transmitted to the coil 28 by the supply 31 will produce a current in the closed conductive path mentioned above such as indicated in FIGURE 1 by the reference numeral 33. Since all the contact resistances other than that at the surfaces 12 are of relatively low resistance and in view of the massive metal clamping structure, the major portion of the resistance in the secondary path will be at the abutting surfaces 12 of the members 10 and 11, and consequently most of the induced power in the secondary path is dissipated in heating at this point. Furthermore, as the temperature at the junction of the pipes 10 and 11 rises, the resistance at the joint also rises; resulting in further heating until eventually the surfaces 12 reach the fusion temperature. At this time, the force exerted by the actuator 20 forces the surfaces 12 further together, causing fusion of the two pipes and the desired weld.

It should be noted that in the above-described resistance butt welder, no insulating members of high mechanical strength need be provided in the clamping structure. Moreover, since the clamping structure itself forms the secondary of the transformer, when the welder is to be used underwater, only the primary winding 28 need be provided with a waterproof coating. Such a coating may be provided, for example, by potting the core 27 and the coil 28. Additionally, the conductors 29 and 30 would have to be enclosed in an insulated, waterproof cable so that the high-voltage source 31 may be maintained at the surface. It should also be noted that with this type of resistance welder, the power supply 31 is preferably of a low-frequency alternating current. Since, however, the effective transformer utilized has only a single turn secondary, a very large core 28 may be required. Such a problem can be overcome, however, by exciting the primary at a frequency higher than the normal power frequency of 60 cycles per second. For example, a 400 cycle per second alternating current may be utilized in order to reduce the size of the core.

An additional problem which presents itself in underwater welding is that of dissipation of the heat generated in the weld area by the water surrounding the welding apparatus. Since in order to raise the temperature of the pipes at the weld area to a temperature at which fusion results, it is necessary to vaporize the water in contact with the weld area; if a continuous supply of water is permitted to flow around the weld area, considerable quantities of heat will be dissipated, requiring a longer period of time for the weld to occur and greater welding currents. Accordingly, some means for restricting the flow of water around the weld area must be provided. For example, an inverted chamber could be placed over the weld so that the steam generated in welding would displace any remaining water in the chamber. Such a chamber, however, would tend to be quite cumbersome and troublesome to install and, moreover, would present problems with respect to any surveillance equipment which was being utilized to observe the weld. In order to restrict the flow of water to the weld area, a nonconducting sleeve 34 is provided which surrounds the weld area and loosely fits over the abutting ends of the pipes 10 and 11. It has been found that such a sleeve will sufficiently restrict the flow of water to allow the welding equipment to operate satisfactorily when completely submerged. The sleeve 34 may be fabricated from any material which will momentarily withstand the temperatures existing at the weld and preferably is fabricated of a clear plastic such as Tygon in order to allow for observation of the weld area by, for example, an underwater television camera.

In order to aid in the alignment of the two sections of pipes 10 and 11 when welding underwater, as shown in FIGURE 2, a nonconductive plug 35 of ceramic or other material which has an outer diameter substantially that of the inner diameter of the pipes, is partially extended into one of the pipe sections, for example, the pipe section 10. When the two pipes are aligned and brought together by means of the clamping and aligning structure 13, the plug 35 will then extend into both the pipes 10 and 11 in the weld area. In addition to acting as an aid in aligning the pipes, the plug 35 also aids in producing better welds, since it prevents any upset or weld flash, as often occurs in welding, from restricting the pipe bore. Once the weld is completed, it is undesirable that the plug still remain in the pipeline. In order to remove the frangible plug 35 from the pipeline, the plug is provided with a bore 36 extending therethrough so that a pig or go devil can be pumped through the line to knock out or disintegrate the plug which can then be circulated out of the pipeline. It is to be understood, however, that, depending on the particular material used for the plug 35, other methods may be used for its removal. For example, the plug may be formed of a material which is soluble in a fluid to be circulated through the pipeline, or may be formed from a material which can be melted out of the pipeline by the continuous application of heat at a lower temperature and a longer duration than that required for welding.

It is further to be understood that, although not shown, the aligning and clamping means 13 may be automatically controlled from a remote location, for example, from the vessel 32 on the surface, when the welder is to be used for underwater welding. Moreover, while the invention has been disclosed specifically for use in welding pipes together, the technique may equally be used for welding metal members of other shapes, for example, rods or plates.

Obviously, various other modifications of the invention are possible in the light of the disclosure without departing from the spirit and scope of the invention. It is, therefore, to be understood that within the scope of the appended claims, the invention may be practiced otherwise than as specifically illustrated.

I claim as my invention:

1. Apparatus for resistance butt welding the ends of two pipes together at an underwater location comprising:
   a conductive metal clamping means for holding said ends of said pipes in aligned and abutting relationship, said clamping means and the abutting ends of said pipes forming a closed, relatively low impedance electrically conductive circuit path with the major portion of the resistance in said path being at the abutting surfaces of said pipes;
   means coupled to said clamping means for forcing the abutting ends of said pipes together under a predetermined pressure;
   means disposed adjacent the abutting ends of said pipe for restricting the flow of water about the abutting ends;
   a toroidal magnetic core having a helical coil wound thereon encircling a portion of said clamping means whereby said coil and said conductive path are inductively coupled, said helical coil being protected by a waterproof insulating coating; and
   a relatively high impedance source of alternating current connected to said coil.

2. The apparatus of claim 1 wherein said means for restricting the flow of water comprises a sleeve encircling the abutting ends of said pipes.

3. The apparatus of claim 1 including a ceramic plug extending into each of said abutting pipe ends, said plug having an outer diameter substantially the same as the inner diameter of said pipes and having a borehole extending therethrough.

4. The apparatus of claim 3 wherein said clamping means comprises:
   first and second slidably engageable members, each of said members having a gripping means for holding one of said metal pipes, said gripping means contacting said metal pipes substantially about their entire circumference.

5. The method of resistance butt welding together opposed ends of two pieces of metal at an underwater location comprising:
   clamping the opposed ends of said two pieces of metal together under pressure by means of a metal clamping structure so as to form a closed, relatively low impedance conductive path including said clamping structure and said opposed ends of said two pieces of metal;
   restricting the flow of water around the clamped ends of said pieces of metal;
   inductively coupling a multiturn winding to said closed conductive path; and
   coupling a relatively high impedance alternating current power source to said winding, whereby a large current will be induced in said closed conductive path, said current causing said opposed ends of said two pieces of metal to be heated and welded together.

References Cited

UNITED STATES PATENTS

| 666,162 | 1/1901 | Thomson | 219—101 |
| 1,254,411 | 1/1918 | Kronenberg | 219—72 X |
| 1,350,572 | 8/1920 | Smith | 219—72 X |
| 1,679,702 | 8/1928 | Wysong | 219—160 X |
| 1,827,210 | 10/1931 | Siebs | 219—72 |
| 2,796,843 | 6/1957 | Kleppinger | 219—160 X |
| 2,847,958 | 8/1958 | Norton et al. | 219—160 X |

RICHARD M. WOOD, *Primary Examiner.*

B. A. STEIN, *Assistant Examiner.*